United States Patent [19]

Terrell

[11] 3,873,740

[45] Mar. 25, 1975

[54] COARSE AND FINE, COMMINUTED, MEAT FOOD MIXES FOR MEAT FOOD EMULSIONS FOR CURED, SAUSAGE-TYPE, MEAT FOOD PRODUCTS, AND METHODS OF PRODUCING SAME

[75] Inventor: Robert N. Terrell, La Grange, Ill.

[73] Assignee: The Griffith Laboratories, Inc., Chicago, Ill.

[22] Filed: July 24, 1974

[21] Appl. No.: 491,266

Related U.S. Application Data

[63] Continuation-in-part of Ser. No. 388,794, Aug. 16, 1973, abandoned.

[52] U.S. Cl.................. 426/212, 426/149, 426/205, 426/266, 426/371
[51] Int. Cl........................ A22c 11/00, A23b 1/02
[58] Field of Search ........... 426/104, 149, 205, 266, 426/371, 224, 212, 264, 265

[56] References Cited
UNITED STATES PATENTS

| | | | |
|---|---|---|---|
| 2,881,076 | 4/1959 | Sair | 426/205 |
| 3,391,007 | 7/1968 | Sair et al. | 426/266 |
| 3,488,770 | 1/1970 | Atkinson | 426/104 |
| 3,812,267 | 5/1974 | Atkinson | 426/104 |

*Primary Examiner*—Hyman Lord
*Attorney, Agent, or Firm*—Merriam, Marshall, Shapiro & Klose

[57] ABSTRACT

Methods of producing coarse or fine, comminuted, meat food mixes for use in making cured, meat food emulsions for forming sausage-type, meat food products for humans, which products have or provide, among other things, improved nutritional and, if desired, improved organoleptical characteristics.

Coarse or fine, comminuted, meat food mixes and/or emulsions for use in cured, sausage-type, meat food products, which products have or provide, among other things, enhanced nutritional and, if desired, enhanced organoleptical qualities.

22 Claims, No Drawings

COARSE AND FINE, COMMINUTED, MEAT FOOD MIXES FOR MEAT FOOD EMULSIONS FOR CURED, SAUSAGE-TYPE, MEAT FOOD PRODUCTS, AND METHODS OF PRODUCING SAME

This application is a continuation-in-part of my copending U.S. application Ser. No. 388,794, filed on Aug. 16, 1973 now abandoned.

This invention relates to coarse or fine, comminuted, meat food mixes for use in making cured, meat food emulsions for forming meat food products for humans, which products have or provide improved nutritional and, if desired, improved organoleptical characteristics.

Moreover, this invention relates to and includes coarse and fine, comminuted, meat food mixes, including a combination of appropriate proportions of edible natural flesh and coarsely-divided, textured, "extrusion-expanded" protein or proteinaceous material (as explained below, for purposes of this application only, the term textured "extrusion-expanded" protein or proteinaceous material includes textured "extrusion-puffed", textured, "explosion-puffed," and/or textured "balloon-puffed" protein or proteinaceous extrudate, despite distinctive and significant differences between such textured protein products and respective methods of producing such products), for forming cured, meat food emulsions at an adjusted pH of 5.5 to 6.4, preferably 5.7 to 6.2, which emulsions may be effectively cured to provide meat food products for humans having enhanced nutritional balance, as well as enhanced organoleptical, meat-like properties in the mouth.

Still further, my invention relates to and includes methods for preparing meat food products having enhanced nutritional qualities, as well as enhanced organoleptical qualities. Such methods include or involve uniformly emulsifying and/or comminuting in the presence of, preferably, an added, edible alkali metal or alkaline earth metal chloride such as sodium chloride, a coarsely or finely comminuted, meat food mix to be cured containing edible natural flesh, edible, coarsely-divided, textured, extrusion-expanded protein or proteinaceous material (e.g., plant or milk protein), and edible, nitrogen-containing curing salt or, more specifically, edible nitrite and/or nitrate curing salt (which is reduced to or forms nitric oxide in the meat mix or emulsion and an added edible acidulent which effects a pH adjustment, so that the coarsely-divided, textured, extrusion-expanded protein has its pH reduced before or during emulsification toward the vicinity of that of the natural flesh and/or the pH of the entire meat food mix is reduced or adjusted before or during emulsification to a value within the range of 5.5 to 6.4, preferably 5.7 to 6.2. The emulsion so produced is subjected to curing at that pH to effect the curing of the natural flesh in the emulsion and the fixing of its cure color. The resultant cured, emulsified, meaty food product has desired, enhanced nutritional and organoleptical characteristics and may be used in making what is referred to herein as cured "sausage-type", meat food products, including sausages, frankfurters, bologna, loaves or luncheon meats, sectioned or chunked and formed, cured, cooked, meat food products, and the like, which meat food products may be packed, for example, in flexible, natural or synthetic casings, jars or cans.

Referring first to the nutritional aspects of the present invention, an individual's nutrition may be poor or good, depending principally on the food that is eaten. Well-nourished persons have strong bones, muscles and teeth, and healthy blood and skin. Scientists have heretofore found that for the human body to operate satisfactorily, an individual's diet should include essential nutrients in a desired balance and in a readily utilizable form. The five major types of nutrients are (1) proteins, (2) carbohydrates, (3) fats, (4) vitamins, and (5) minerals. Additionally, some scientists consider water a nutrient because of the important role it plays in the operation of body processes.

While the human body is capable of synthesizing many of the amino acids which form the component parts of proteins necessary for body functions, certain essential amino acids cannot be so synthesized and thus must be supplied in the individual's diet. The essential amino acid requirements of the human diet include dietary tryptophan, phenylalanine lysine, threonine, valine, methionine, leucine, and isoleucine. The most useful biological measures of protein quality are (1) the protein efficiency ratio (PER), (2) the biological value (BV), and (3) the net protein utilization (NPV).

Carbohydrates and fats are important energy sources for humans. Fats, in particular, generally supply more than twice the energy than the same weight of carbohydrates or proteins, and also furnish certain vitamins and essential fatty acids that the body cannot make or obtain from other sources. It has been determined heretofore that fats from natural flesh provide an excellent source of essential fatty acids.

Vitamins are nutrients that in low concentrations regulate or catalyze body processes. Many experts believe that the six essential vitamins required by man are vitamins A, C and D, and those B vitamins which are referred to as thiamine ($B_1$), riboflavin ($B_2$), and niacin.

Minerals make up a large part of our bones and teeth, and small amounts are essential to the proper function of muscles, blood and the nervous system.

Water is an essential part of all tissue. It aids in the digestion and absorption of food, the carrying of food to the tissues, and the removal of body wastes, and also plays an important part in regulating body temperature.

Natural meat generally is considered in countries such as the United States to be important for a well-balanced diet. It is a highly digestible food containing proteins, minerals, vitamins, fats and carbohydrates. However, natural meat is an expensive source of dietary protein.

Most edible cuts of raw, separable, lean portions of natural meat, such as beef, pork, lamb and veal, commonly contain, for example, 18–22% protein, 67–74% moisture, 5–11% fat, and 1–1.5% ash. Analyses of such lean meat portions after cooking indicate an increase in the amounts of these materials, largely due to the loss of some water (e.g., 42–63%) during cooking, to values, for example, such as 27–31% protein, 6–13% fat, and 1–2.2% ash.

A typical commercially cured, cooked, sausage-type, meat food product in the United States may contain, for example, 9–12% protein, 27–30% fat, and 54–60% moisture.

Proteinaceous, non-flesh products from defatted (e.g., solvent-extracted) leguminous plants such as soybeans are rich in food value, and generally are lower in fat and higher in protein than beef. Solvent-extracted soybeans have, for example, about 44% or more (e.g., at least about 50%) protein on a dry weight basis and include the essential amino acids tryptophane, phenylalanine, lysine, threonine, valine, methionine leucine and isoleucine.

Table A, below, shows the composition of an 100-gram, edible portion from four types of food products, as reported by two different sources, namely, samples of dried (solids), non-fat cow's milk, defatted soybean flour, cooked frankfurters, and cooked halibut, and is presented herein to illustrate some of the nutritional benefits which might be obtained by using proteinaceous materials such as defatted soy protein, or even protein from a milk source, including using such proteinaceous materials in making or formulating sausage-type food products having some natural meat or flesh.

As shown in Table A, above, the defatted soy protein sample had the highest protein content, followed by the sample of proteinaceous, dried, solid, non-fat cow's milk. Samples of both of those particular food products had a low fat content, a high carbohydrate content, and a high content of the minerals calcium, phosphorus and potassium. The defatted soy protein sample had the highest content of the mineral iron, and, in at least one instance, the mineral potassium. Moreover, the sample of defatted soy protein had the highest content of the vitamins thiamine and niacin, followed by the sample of dried, non-fat cow's milk. The sample of dried, non-fat cow's milk had the highest content of the vitamin riboflavin, followed by the sample of defatted soy protein.

The chemical analysis of a typical, commercial, cured, cooked, frankfurter product used in the United States may have, for example, the approximate composition shown in Table B, below:

Table B

| | |
|---|---|
| Protein | 9 to 12% |
| Fat | 27 to 30% |
| Ash and Carbohydrate | 2 to 5% |
| Moisture | 54 to 60% |

The chemical analyses of cured, cooked, sausage-type, meat food products, including frankfurters, of my invention may have, for example, the approximate composition shown in Table C, below:

Table C

| | |
|---|---|
| Protein | 12 to 17% |
| Fat | 17 to 24% |
| Ash and Carbohydrate | 5 to 9% |
| Moisture | 54 to 60% |

The products exemplified or illustrated by the analyses of Table C, above, are shown therein to have a higher protein content and lower fat content than those exemplified by Table B, above, a result now desired by nutritionists. Furthermore, products reflected in the analyses of Table C have a desirable moisture-protein ratio (e.g., M/P of 1.2 to 5.5:1, preferably 2.1 to 4.9:1).

My invention provides food products which afford enhanced biological utilization of the total protein content thereof, protein from diverse sources, and enhanced overall nutritive value. This invention involves supplementing the nutritional qualities of each of (a) edible natural flesh and (b) edible, essentially non- Table A Composition of 100-Gram, Edible Portion of Foods Reported by Two Sources

| Food | Water (%) | Food Energy (Calories) | Protein (Grams) | Fat (Grams) | Carbohydrate Total (Grams) | Fiber (Grams) | Ash (Grams) | Calcium (Milligrams) | Phosphorus (Milligrams) | Iron (Milligrams) | Sodium (Milligrams) | Potassium (Milligrams) | Vitamin A Value (IU) | Thiamine ($B_1$) (Milligrams) | Riboflavin ($B_2$) (Milligrams) | Niacin (Milligrams) | Ascorbic Acid (C) (Milligrams) |
|---|---|---|---|---|---|---|---|---|---|---|---|---|---|---|---|---|---|
| Non-Fat, Dried Cow's Milk[1] | 3.0 | 363 | 35.4 | 0.8 | 52.3 | 0 | 8.0 | 1,308 | 1,016 | 0.6 | 532 | 1,745 | 30 | 0.35 | (1.80) | 0.9 | 7 |
| Non-Fat, Dried Cow's Milk[2] | 3.5 | 362 | 35.6 | 1.0 | 52.0 | 0 | 7.9 | 1,300 | 1,030 | 0.6 | 528 | 1,130 | 40 | 0.35 | 1.96 | 1.1 | 7 |
| Defatted Soybean Flour[1] | 8.0 | 326 | 47.0 | 0.9 | 38.1 | 2.3 | 6.0 | 265 | 655 | 11.1 | 1 | — | 40 | 1.09 | 0.34 | 2.6 | 0 |
| Defatted Soybean Flour[2] | 11.0 | 228 | 44.7 | 1.1 | 37.7 | 2.3 | 5.5 | 265 | 623 | 13.0 | — | 1,820 | 70 | 1.10 | 0.35 | 2.9 | 0 |
| Cooked Frankfurters[1] | 57.3 | 304 | 12.4 | 27.2 | 1.6 | — | 1.5 | 5.0 | 102 | 1.5 | — | — | — | 0.15 | 0.20 | 2.5 | — |
| Cooked Frankfurters[2] | 62.0 | 248 | 14.0 | 20.0 | 2.0 | — | 2.0 | 6.0 | 49 | 1.2 | 1,100 | 220 | 0 | 0.16 | 0.18 | 2.5 | 0 |
| Cooked Halibut[1] | 66.6 | 171 | 25.2 | 7.0 | 0 | — | 1.7 | 16.0 | 248 | 0.8 | — | 525 | 680 | 0.05 | 0.07 | 8.3 | — |
| Cooked Halibut[2] | 64.2 | 182 | 26.2 | 7.8 | 0 | — | 1.9 | 14.0 | 267 | 0.8 | 134 | — | — | 0.06 | 0.07 | 10.5 | — |

A hyphen indicates no value or no accurate data reported.
Value in parenthesis denotes an imputed value.

[1] denotes values reported in USDA Handbook No. 8, "Composition of Foods", by B. K. Watt and A. L. Merrill, Revised Dec. 1963 (pages 33, 39, 55 or 59).

[2] denotes value reported in "Nutritional Data", by H.J. Heinz Co., Pittsburgh, Pa., 5th Edition, 1963 (pages 84, 90 or 96).

flesh, coarsely-divided, textured, extrusion-expanded, proteinaceous materials with the other, provided appropriate proportions of each are used. One may thus prepare meat food products, in accordance with my invention, which have an enhanced balance of important nutrients, including cured, sausage-type, meat food products which are high in protein and low in fat content. Cured, sausage-type, meat food products may be prepared in accordance with my invention having, for example, 16% protein, 19% fat, 8% ash and carbohydrate, and 56% moisture.

Referring next to the organoleptical characteristics of my cured, meat food emulsions, the term "organoleptical" in the food art refers to the human sensory evaluation of foods with respect to texture (e.g., tenderness, toughness or bite in the mouth), flavor and juciness. As used herein, that term particularly refers to the meat-like chew and texture of the cured, cooked, emulsified, meat food product, as evidenced, for example, by its meat-like bite and snap. The terms "meat mix," "meat food mix," "mix" (e.g., when not referring to a "protein mix" used to make the textured, extrusion-puffed or balloon-puffed protein), as used herein, refer to natural flesh-containing mixes for use in making coarse or fine, comminuted or emulsified, meaty food products having appropriate amounts of edible natural flesh and coarsely-divided, textured, extrusion-expanded protein (e.g., textured vegetable protein) from at least in part or essentially non-meat or non-flesh sources, including non-fresh meat or flesh sources.

The terms "meat," "natural meat," "flesh" and "natural flesh," as used herein, refer to edible, skeletal or non-skeletal, natural flesh (e.g., fresh, chilled or frozen) from a variety of mammals (including cattle), fowl, and fish, including shell fish, such as used in producing meat food emulsions for forming cured, sausage-type, meat food products, as exemplified by frankfurters, bologna, luncheon meat or loaves (e.g., olive loaf), Polish sausage, Italian sausage, bratwurst, pork sausage, and sectioned or chunked and formed, cured, cooked, meat food products. In producing such fine or coarse, comminuted, meat food products, or the cured, meat food emulsions used to make them, a wide variety of edible natural flesh, or combinations thereof, is or can be used, including, preferably, lean (e.g., 15–20% fat), or, if desired, fat (e.g., 50% fat) beef, pork jowls, picnics, pork hearts, pork stomachs, deboned turkey meat, deboned chicken meat, regular pork trim, whale flesh, trash fish, mackerel, grouper, and the like. Accordingly, those terms as used herein, do not distinguish between poultry, fish or cattle cuts.

In one variety of sausage-type, meat food products such as frankfurters, bologna, and loaves or luncheon meats, the meat food mix is coarsely or finely comminuted to form meat food emulsions of lean meat and fat, and subsequently cured.

Coarsely or finely, comminuted, meat food products also may be used to produce meat food emulsions for use in another variety of sausages, such as Polish sausage, Italian sausage, bratwurst, and pork sausage. This variety of sausage products generally is not cured; however, if such sausage products are cured or are mildly cooked, the resulting sausage-type, meat food products may be grouped with the first variety referred to above and shall be subject to my invention.

The so-called emulsification of the meat food products involves the physical incorporation of the fat content thereof as dispersed, finely-divided particles with the protein of the lean portion functioning as a dispersing agent. The finely-divided fat content thereof thus becomes encased or enrobed by meat protein.

In forming meat emulsions, for example, the meat mix is comminuted and emulsified in the presence of a curing salt composition (e.g., 90% sodium chloride, 6% sodium nitrite and 4% sodium nitrate), and with added water, finely-divided, protein emulsifying agent, and other materials. In view of U.S. Government requirements, no more than 200 ppm. of residual nitrite should be present in finished meat food products.

These emulsions must be stable and not "break" or "short" (in which case the fat separates out) during commercial production.

In the past, meat materials and other constituents for sausage-type meat products, including sausages, frankfurters, bologna, and the like, were subdivided or comminuted in an auger-type grinder, followed by treatment in a mixer or blender, or were further comminuted in a Silent Cutter chopper. Generally, in using such machines, particularly the Silent Cutter chopper, air was introduced, incidentally, into meat food products.

Later, in making fine, meat food emulsions, the meat processing industry utilized high-speed, centrifugal, fine comminuting machines or emulsifiers, such as disclosed in U.S. Pat. Nos. 3,044,514 and 3,304,976 to Schnell, to emulsify, without substantial ingress of air or excessive temperature rise and with high throughput, meat food products that had been previously comminuted and/or blended with fat, moisture, seasoning and other additives in a grinder, chopper, mixer, or blender. Such fine comminuting machines produce an improved, finely comminuted or emulsified, substantially homogeneous, meat food emulsion without overheating the product. The resulting meat food emulsion generally is fed to a stuffer that stuffs the meat food emulsion into flexible food casings.

One experienced in the meat art, generally understands as the amount of skeletal meat or flesh (or even meat or flesh from fowl or fish) is decreased in the mix (e.g., by using less non-skeletal meat or flesh either with or without protein flour of milk origin or protein flour extracted from cereal, or from oleaginous vegetable or cotyledon seed materials), the textural characteristics of the meat food mix or emulsion tend to be reduced, the cured color tends to be less vivid, and the shelf-life stability of the meat food emulsion tends to be reduced.

Cured, sausage-type, meat food emulsions generally have the following levels of moisture:

a. 60–75%,
b. 45–60%, and
c. 20–45%, which may be at least in part added to the mix in the form of liquid water or ice, and may be classified as high moisture, intermediate moisture, and low moisture, sausage-type, meat food products, respectively.

After the meat food emulsion is formed, it may be transferred to stuffing apparatus which inserts it into flexible casings (e.g., cellulose and/or collagen casings). The stuffed, meat food products are thereafter cured (partly or fully cooked or smoked) to produce finished, sausage-type, meat food products. It is during this curing step that the desired cure color development occurs.

In some instances, the meat food emulsion may be cured and filled by hand, by a filling machine, or by an extruder under pressure into hermetically sealed jars or cans, and, if desired, cooked, retorted, or chilled therein.

To stabilize or secure the desired, fixed cured color, the meat food mix or emulsion is heated or partly or fully cooked.

Fresh, natural, post-rigor meat normally has a pH in the range of, for example, about 5.7 to about 6.2, largely because of its content of lactic acid formed at slaughter (during the period of rigor mortis) by the breakdown of blood and muscle sugar such a glycogen.

When my invention involves enhancing the organoleptical qualities of the meat food mix or emulsion, or cured, sausage-type, meat food product produced therefrom, an edible acidulent (includes acidulent-forming materials), preferably, is added to or included with the mix to lower the pH of individual components of the mix, including the non-flesh components, and to adjust the pH of the entire mix to a pH within the range of 5.5 to 6.4, preferably 5.7 to 6.2, or to lower the pH to lower levels of those ranges, before, during or after comminution and/or emulsification of the mix. If the pH of the mix has the requisite pH (e.g., because of naturally occuring acidulent present in or with the flesh), the need for adding acidulent becomes less important, unless one wishes to reduce the pH of the entire mix further. This enhances or accelerates the curing reaction of the edible natural flesh and assists in achieving and maintaining good cure color, good color stability and good shelf-life (e.g., reduced microbal spoilage). Particularly good results are obtained with respect to enhancement of the organoleptical properties, when acidulents are used such as alkali metal acid pyrophosphate (e.g., disodium acid pyrophosphate), as disclosed in U.S. Pat. No. 3,391,007 to Sair and Komarik; however, other acidulents, or combinations thereof, such as citric acid, ascorbic acid, lactic acid, sorbic acid, proprionic acid, benzoic acid, erythorbic acid, and their water-soluble salts, and glucono delta lactone (lowers the pH, at least in part, after emulsification) may be used.

If desired, at least part of the edible acidulent may be included with or in other materials which are added to the meat mix, or may be added as such to the mix.

Moreover, if desired, the acidulent need not be added as such to the mix, provided the pH of the mix or emulsion otherwise falls within the requisite pH range for curing purposes.

As used herein, the term "up to" a specified percent of added edible acidulent includes, if desired, the complete absence of such added acidulent (i.e., 0% added acidulent), provided the pH of the mix or emulsion falls within the requisite pH range.

More specifically, as disclosed in U.S. Pat. No. 3,391,007, a meat food emulsion having a nitrogen-containing curing salt (e.g., alkali metal nitrite and/or alkali metal nitrate) is formed in the presence of an edible acidulent to lower the pH of the meat or flesh in the presence of a phosphate radical which counteracts shorting of the meat emulsion to a cured condition. The alkali metal pyrophosphate (e.g., disodium acid pyrophosphate) reduces the pH of the meat (e.g., from about 5.9 to about 5.6), thereby accelerating curing, without decreasing the desired emulsifying characteristics of the meat, which usually accompanies the lowering of the pH. More specifically, the alkali metal pyrophosphate acts or coacts with the meat protein in some manner to counteract emulsifying disadvantages theretofore associated with increased acidity, and allows the meat protein to emulsify effectively the fat content and to accelerate the cure color development and to utilize the nitrite more effectively to reduce residual nitrite in the cured product.

Food technologists have been interested for many years in developing or providing proteinaceous food materials which simulate or have the shape and texture of natural food products, particularly natural meat-like or flesh-like products. Many efforts heretofore have been made, for example, to develop satisfactory meat substitutes, analogs, supplements or extenders which would simulate the appealing mouth-feel, texture and appearance of natural meat or meat-like or flesh-like products such as steaks, fowl, chops, hams, fish, and the like. Extensive development has been undertaken in recent years, for example, to formulate meat substitutes from casein and vegetable and cereal grain materials.

Thus, U.S. Pat. Nos. 2,682,466 and 2,730,447 to Boyer, for example, in describing the preparation of long, essentially continuous, fine protein fibers, relied upon wet spinning technology developed in the production of synthetic fibers for the textile industry in an effort to produce simulated, meat-like food products. Those patents describe the preparation of long, essentially continuous, fine fibers or filaments by providing a solution or colloidal dispersion of protein in an aqueous alkaline phase, passing such solution or dispersion through the fine openings of a spinnerette and into an acid coagulating bath, and recovering and stretching the resulting long, essentially continuous, fine fibers. That product, with additives or binder, could be shaped and formed into a food product. Such methods met with only limited commercial success and suffered from a number of disadvantages, including shortcomings as to economic factors and their undesired, functional characteristics within the processed, natural meat environment. Such thin, spun protein fibers or filaments are not "extrusion-expanded", as that term is used herein.

A more recent approach to producing textured, fibrous proteinaceous products which currently is being used commercially, is illustrated by U.S. Pat. No. 3,488,770 to Atkinson, and involves so-called extrusion-puffing and extrusion-cooking wherein the flowable, hot plastic melt from an extruder emerges from the extruder to produce virtually instantaneously a puffed, textured, vegetable protein product. That patent concerns an extrusion-puffed protein, which is one type of extrusion-expanded protein, as the latter term is used herein; as explained later below, balloon-puffing is another type of process for producing extrusion-expanded protein.

I have discovered that when certain textured protein products, namely, appropriately sized, hydrated or hydratable, coarsely-divided, textured, extrusion-expanded, protein or proteinaceous products, are appropriately combined in certain proportions with edible natural flesh, (a) a beneficial augmenting of their individual nutritional qualities results; and by appropriately including an edible acidulent (as explained above, in some instances it need not be added as such) and/or edible plasticizer, in proper proportions, (b) the organoleptical characteristics of the coarsely-divided, textured, extrusion-expanded, protein or proteinaceous material, as well as the entire cured, comminuted or emulsified, meat food mix, are also desirably enhanced. Moreover, the combination of those materials, in appropriate amounts, allows the cured, comminuted or emulsified, meat food mix to achieve and maintain good cure color, good color stability, and good shelf-life (e.g., reduced microbal spoilage), which properties are interrelated with enhanced organoleptical properties thereof.

The hydratable or hydrated, coarsely-divided, textured, extrusion-expanded, protein or proteinaceous material used in my invention is, at least in part or essentially, not derived or obtained from meat or flesh and must have at least 40%, preferably at least about 50%, protein on a dry basis and, as added to or incorporated in the mix, must not be in a finely-divided form, for example, resembling flour, and, even though the meat food mix is later comminuted and emulsified, must have sufficiently coarsely-divided (e.g., granular or chunky) particles or pieces so that at least 90% by weight thereof is retained on an 100-mesh U.S. Standard screen. The minimum size limitation (at least 90% on an 100-mesh U.S. Standard screen and, for example, not more than 10% on a 40-mesh U.S. Standard screen) obviates the substantial destruction (e.g., by comminuting or subdivision) of the desired textural characteristics of the material. This proteinaceous material may be added to the mix, if desired, in the form of chunks (e.g., ¼ inch × ½ inch × ¼ inch) or coarse granules. The coarsely-divided protein or proteinaceous material may be added to the mix in an essentially dry form (e.g., moisture content of 5–15%), and commonly has a pH of 6.4 to 7.3.

Moreover, one generally prefers to add the coarsely-divided, textured, extrusion-expanded, protein material to the mix in a hydrated form.

Referring, more specifically, to the so-called extrusion-puffing process as disclosed in U.S. Pat. No. 3,488,770 to Atkinson, the proteinaceous material or extrudate purportly must emerge from the extruder at an extrusion temperature of at least 250°F. and preferably above 300°F. Moreover, the extrusion pressure, as purportly measured by the pressure drop across the extrusion orifice, is at least 100 psi. and preferably is in the range of about 200 to 900 psi. These "uncontrolled" extrusion-puffing conditions induce uncontrolled, explosive puffing.

In making a hydratable, porous, extrusion-puffed, open cellular, coarsely-divided, textured protein component (such as exemplified by U.S. Pat. No. 3,488,770 to Atkinson), a hot melt is formed by subjecting a protein mix of protein material, such as vegetable protein or casein, and water (e.g., 10–60% water based on the weight of the protein mix) to mechanical working which involves the use of mechanical pressure, mixing and shearing action under sufficiently elevated temperature conditions (e.g., water puffing conditions of at least 210°–212°F.), to produce a flowable, hot, plastic melt, giving dimensions to the melt by a forming operation, and extruding the hot melt under pressure through a restricted orifice into a discharge zone or environment of substantially lower pressure and temperature, such as exists at substantially atmospheric conditions. The emergence of the flowable melt or extrudate from the extruder under water-boiling puffing conditions (e.g., above 210°–212°F.) provides a sudden release of substantial pressure and moisture from the melt or extrudate and thereby results in instantaneous puffing. The forming, extrusion and expansion of the melt or extrudate occur virtually simultaneously. The extrusion-puffed protein product may be dried to an essentially dry state (e.g., 5–15% moisture) and subdivided, cut or ground into coarsely-divided chunks or coarse granules.

U.S. Pat. No. 3,812,267 to Atkinson concerns extruded meat-like products comprising 75–99% by weight of a solvent-extracted, oil seed proteinaceous material having a protein concentration of at least 30% and 1–25% by weight of fish protein concentrate having a protein concentration of about 75–80% and containing less than 0.5% fat. That protein product is obtained by the extrusion of moistened mixture of solvent-extracted, oil seed proteinaceous material and fish protein concentrate in the form of a plastic mass at a temperature above 200°F. through an orifice into a medium of lower pressure to purportedly produce an expanded open-cell structure. That extrusion-expanded product is an essentially non-flesh material and is essentially from a non-flesh source.

The foregoing continuous extrusion-puffing operations may be conducted in a variety of screw-fed, heatable extruders (e.g., Prodex or Wenger Model X-25 extruders) such as disclosed in U.S. Pat. No. 3,117,006 to Wenger or, if desired, may be conducted in separate pieces of equipment as separate and distinct operations, the last of which operations involves extrusion-puffing. When separate and distinct operations and equipment are used (such as disclosed in pending U.S. application Ser. No. 77,720, filed by Louis Sair on Oct. 2, 1970, which is hereby expressly incorporated by reference herein), the first operation involves subjecting a moist protein or proteinaceous mix to heavy, mechanical compaction pressure (e.g., compression rolls) to convert the mix to a melt to form a moist, dense, essentially non-puffed and non-expanded, translucent to glassy product, and then, as a separate and distinct operation, forming and extruding the hot viscous flowable melt formed from the moist, translucent to glassy product, thereby producing an extrusion-puffed or extrusion-expanded, protein or proteinaceous extrudate upon emergence of the melt or extrudate into the atmosphere or discharge zone of reduced pressure and temperature.

A coarsely-divided, textured, extrusion-expanded protein or proteinaceous, balloon-puffed product may also be added to or included in my meat mix. Although both coarsely-divided, textured, balloon-puffed and coarsely-divided, textured, extrusion-puffed, protein or proteinaceous products are considered herein as being extrusion-expanded protein products for purposes of my invention and either or both such products may be added to and included in my meat food mix and emulsion, they are significantly different, textured protein products and are made by significantly different processes, as pointed out in pending U.S. application Ser. No. 469,940, filed by Louis Sair and Donald W. Quass on May 15, 1974. That application is a continuation-in-part of copending U.S. application Ser. No. 376,685, filed by Louis Sair and Donald W. Quass on July 5, 1973. Said application Ser. No. 469,940 is hereby expressly incorporated herein by reference thereto.

The terms "cells" and "cellular," as used in that application, refer to the macroscopic cell-like cavities, tubules or bubbles (e.g., evident upon gross visual examination of the product) which are formed within the mass under the conditions described.

The term balloon-puffing, as used in that application, refers to the forming of cells within a mass (e.g., proteinaceous mass) by gradual or restricted expansion without significantly rupturing or disrupting the mass or walls as occurs in explosion-puffing. Balloon-puffing is normally initiated within a die which is connected to an extruder, but may be continued after emergence of the mass from the die. The cells generated within the melt or matrix may constitute, for example, from about 20% to about 60%, or more of the volume of the final extrudate. The balloon-puffed products disclosed in that application should not be disintegrated by explosion-puffing.

In a preferred method of that application, a hot viscous proteinaceous mass, in the form of a column [e.g., solid, tubular (i.e., annular), or helical], such as a column of proteinaceous melt containing a volatile component, is forced or pressed through and from a length of an open-ended die assembly having a die orifice (e.g., at the discharge, downstream end of the die assembly) into a discharge zone. The temperature of the mass in the die assembly is below the applicable boiling point of the volatile component during a portion of its passage through the die assembly (under the temperature-pressure conditions prevailing in that portion), and above (e.g., sufficiently close to or not far above) the applicable boiling point of the volatile component during a later, downstream portion of the confined passage, so that restricted boiling of the volatile component occurs within that downstream portion of the die assembly. This results in producing limited, restricted boiling and balloon-puffing (as contrasted with explosion-puffing) before, and, in the making of some such products, after, emergence of the mass from the die orifice.

By "confined," that application points out that the column of material is in forced contact with walls of the die assembly.

In a preferred method of that application, the confined melt is worked in the die under conditions which produce steam-expanded cells and a three-dimensional network structure involving disulfide bonding. The distinctive network structure of preferred products of that application has remarkable stability characteristics, and such products retain their structural integrity despite the rigors of retorting.

In that application, heat and pressure are applied to a moist feed stock (e.g., a moist, crumbly, feedable protein mix having proteinaceous material and added water) to convert the feed stock to a viscous plastic melt. Proteinaceous plastic melts formed from protein mixes containing, for example, defatted oil seed vegetable protein, generally have a glassy appearance and an amorphous structure.

The moist feed stock disclosed in that application has a volatile component, normally water. Although the moist feed stock may have, for example, as much as about 45% by weight water, based on the total weight of such feed stock, it should not be dough-like at ambient conditions, at least for handling in conventional extrusion assemblies, and the level of water present should not interfere with forming or destroy the desired viscous character of the melt.

In that application, during the passage of the hot melt through the die, some of the volatile component is boiled to initiate the formation of balloon-puffed cells within the confined melt. The cells initially formed within the confined, but advancing, hot melt may provide nuclei for further expansion or balloon-puffing after the product is discharged from the die.

That application points out that the restricted generation of internal gas (e.g., steam) against the opposed compressive forces in the die is accomplished by control of the temperature-pressure relationship of the advancing mass in the die. Thus, the local pressure exerted by or within the die is, in some region, overcome by the generated gas (e.g., steam) pressure, so as to initiate the forming or generating of cells within the confined, hot melt, even though its temperature may have been lowered. The resulting cellular mass or melt (foraminous melt or matrix) is preferably discharged from the die approximately at or in the vicinity of ambient pressure and at a temperature (when water is the liquid volatile component) sufficiently close to 212°F. to avoid disruptive puffing due to the flashing-off of water.

In a preferred procedure of that application, the temperature of such confined, but advancing, hot melt should be controlled sufficiently by the die assembly, so as to initiate the formation of steam-generated cells within the confined, hot melt (preferably, a confined column of hot material) along a length of the die and under the prevailing pressure conditions of the confined melt. Furthermore, the temperature-pressure conditions of such confined, hot melt are deliberately controlled or coordinated within a length of the die, so that balloon-puffing results and the expanded extrudate has a matrix with steam-generated cells therein. During the extrusion of such products into a discharge zone of environment which, for example, is at substantially atmospheric conditions, the temperature at the discharge tip (and mass thereat) of the die (at the region or vicinity of the die orifice) may be controlled, for example, adjusted by being cooled to a temperature sufficiently close to or not far above the applicable boiling point of water (e.g., at or well above about 210°F. to 212°F., or at from about 210°F. to about 230°F.).

However, if one uses, for example, appropriate amounts of proteinaceous material such as casein, or defatted soy protein isolate in the feed stock of that application and the feed stock is moistened with water, a viscous but pressure-flowable hot melt may be produced or formed, for example, at product temperatures of below about 210°–212°F. (e.g., at about 180°F., or more). The temperature-pressure conditions of such confined, hot melt likewise are deliberately controlled or coordinated within a length of the die. In a preferred procedure, the temperature-pressure conditions of such confined, hot melt are deliberately controlled, so as to initiate the formation of steam-generated cells within the confined, hot melt along a length of the die and under the prevailing pressure conditions, and enhance the moisture penetration properties of the extrudate. During the extrusion of such products into a discharge zone which, for example, is at substantially atmospheric conditions, the temperature at the discharge tip (and mass thereat) may be controlled, for example, adjusted by being heated to a temperature sufficiently close to or not far above the applicable boiling point of water (e.g., at or above about 210° F. to 212°F., or at from about 210°F. to about 230°F.). If the mass is to be discharged from the die under vacuum or pressurized conditions, the temperature of the mass should be correspondingly adjusted.

Referring next to textured, extrusion-expanded proteins or proteinaceous materials used in my invention, which need not be limited to products resulting from the processes disclosed in said U.S. application Ser. No. 469,940, I have found that the conversion of the moist protein mix into a flowable, hot melt, and/or the extrusion of the flowable, hot melt in or from the extruder and/or the expansion (e.g., by extrusion-puffing or balloon-puffing) of the hot melt apparently orient(s) the structure of or structure(s) the protein material, which somehow and for some reason results in characteristics which are important, if not essential, to certain aspects of my invention, including enhanced organoleptical qualities.

The proteinaceous material used in producing the protein mix for extrusion-puffing or balloon-puffing (i.e., extrusion-expansion) should be, at least in part or essentially, an edible, non-flesh, protein-containing material of desired size or form (e.g., protein meal in the form of flakes or flour), such as a vegetable or cereal grain protein materials (e.g., wheat gluten or rice gluten) or defatted or solvent-extracted vegetable oil seed, oleaginous, or cotyledon seed materials (e.g., solvent-extracted soybeans, peanuts, cotton seed, and sesame seed), or combinations thereof, having a protein content or concentration (dry weight basis) of at least 40%, preferably at least about 50%. Soy protein concentrates having about 70% protein (dry weight basis) may be used, for example, and such concentrates may have a low or high nitrogen solubility index (i.e., NSI). Proteinaceous materials from milk (e.g., commercial casein) may also be used. The proteinaceous material used may or may not be in an at least partly neutralized form.

It has been reported that the protein efficiency ratios (PER) of soy protein isolate and, to a lesser extent, soy protein concentrate generally, or at least in some instances, are lower than those purportedly credited to solvent-extracted soy meal, flakes or flour; consequently, I prefer to use the latter, in forming the coarsely-divided, extrusion-expanded, protein material. The higher PER value(s) given to solvent-extracted soy meal, flakes or flour apparently is, at least in part, due to their having a better balance of amino acids.

When one wishes to use a bland, proteinaceous product in the protein mix used in extrusion-puffing or balloon-puffing, the protein or proteinaceous material used in the protein mix desirably should have a high protein content. Thus, when defatted soy protein is used, it is generally desirable to use a bland, neutralized, soy protein concentrate which is substantially free of beany or bitter taste-conferring or flavor-conferring material, such as may be produced in accordance with U.S. Pat. No. 2,881,076 to Sair (e.g., "GL-301" soy protein concentrate).

The proteinaceous material used in extrusion-puffing or balloon-puffing may consist of or include a combination or mixture of different proteinaceous materials, for example, from a plant or milk source.

If desired, in the preparing of the meat food mix or emulsion, in accordance with my invention, a finely-divided, debittered, bland, non-textured, soy protein concentrate having about 70% protein on a dry basis, a pH of at least 6.3, and good protein solubility may replace some of the coarsely-divided, textured, extrusion-expanded protein and thereby reduce the amount of the latter, and may be used advantageously in the meat food mix to facilitate emulsifying the edible natural flesh or meat and to bind water. Such soy protein concentrates have been extracted or debittered so as to remove undesired, beany taste or flavor conferring material from the concentrate.

Particularly good results are obtained with a debittered, bland, neutralized soy protein concentrate known as GL-301 soy protein concentrate. That product has a pH of 6.5 to 7.3, a nitrogen solubility index of at least 40%, a sufficient particle size, so that at least 80% of the product is retained on an 100-mesh U.S. Standard screen and not more than 5% is retained on an 80-mesh U.S. Standard screen, and is particularly well-suited for use in meat food emulsions used in making finely-emulsified sausage, frankfurter, luncheon meat products, and the like. Furthermore, that product has a high content of diverse amino acids, based on work published in the Journal of Agricultural and Food Chemistry, Vol. 7, pages 129–131, February, 1959.

More specifically, GL-301 soy protein concentrate is produced in accordance with U.S. Pat. No. 2,881,076 to Sair and is a finely-divided, essentially dry, uniformly palatable, soy protein concentrate comprising essentially that portion of defatted soybean protein which (a) is insoluble in water at a pH of from 4 to 4.8, (b) has been washed and substantially freed of undesired, beany flavor or taste, and (c) has its pH elevated into the pH range of 6 to 10.5. In making that concentrate, the pH of solvent-extracted soybean material is adjusted to the vicinity of the isoelectric point, followed by extensive washing with water to remove undesired, beany taste or flavor conferring material.

In that process, soybean material, for example, in the form of defatted or solvent-extracted flour or flakes, is subjected to the dissolving action of water having a pH in the vicinity of the isoelectric pH of the protein content of the soybean material (a pH of 4 to 4.8), and the insoluble solids, in the form of an essentially insoluble slurry, are separated from the resulting solution. The insoluble solids are then washed. The purpose of those steps is to remove undesired, characteristic beany taste or flavor, odor and color conferring material. The insoluble, soy protein material is neutralized by adding an edible, alkaline agent to the insoluble protein slurry to raise its pH, and the resulting concentrate slurry is dried (e.g., flash dried).

In making GL-301 soy protein concentrate, a solvent-extracted soy flour having a protein content of at least about 50% on a dry basis and nitrogen solubility index of at least 40% is used. The recovered, washed slurry has about 20% solids and a pH of about 4.2 to 4.5. The slurry is heated with agitation to about 160° to 180°F. for about 30 minutes, followed by neutralization at a pH of about 6.5 to 7.3 with a 5–50% solution of sodium hydroxide, and spray drying to provide finely-divided protein particles.

A typical specification for "GL-301" soy protein concentrates follows:

| | |
|---|---|
| Moisture: | 6% (Max.) |
| Protein (N × 6.25) on Dry Basis: | 70% (Min.) |
| Fat (Hexane Extraction) | 1% (Max.) |
| Ash: | 5% (Max.) |
| Crude Fiber: | 3.5% (Max.) |
| Reducing Sugars as Anhydrous Dextrose: | 1.5% (Max.) |
| pH (5% Suspension in Water): | 6.5 – 7.3 |
| Mesh: | 100% (Min.) Through an 80-Mesh U.S. Standard Screen, and 80% (Min.) Through an 100-Mesh U.S. Standard Screen |

The term "edible plasticizer," as used herein, refers to materials or combination thereof which enhance the plasticity and organoleptical qualities of the entire meat food mix, including the coarsely-divided, textured, extrusion-expanded protein or proteinaceous material, in the mouth, as those characteristics relate to enhancement of the meat-like chewiness of the cured, meat food emulsion. When the plasticizer is added to the meat food mix and the mix is comminuted or emulsified, the resulting meat food mix or emulsion is "plasticized." Although some materials which can be used in accordance with my invention as edible plasticizers may have been used heretofore in various unrelated food products as emulsifiers, thickeners or emulsion stabilizers, or for purpose of enhancing the spreading quality of such food products, they serve and are relied on in the environment of my comminuted or emulsified, meat food mix as a plasticizer which enhances the plasticity of the mix, as those qualities relate to meat-like chewiness. Materials such as carboxymethyl cellulose, methyl cellulose, sodium alginate, locust bean gum, guar gum, gum tragacanth, gum karaya, sodium carboxypolymethylene, carrageenin, pectin, vitalized wheat gluten, sodium citrate, disodium phosphate, starch such as potato starch, blood proteins, milk proteins such as casein, egg albumen, and combinations thereof serve as edible plasticizers in the mix. Vitalized wheat gluten and egg albumen are the preferred plasticizers.

If desired, at least part of the edible plasticizer may be included in the protein mix which is extrusion-puffed or balloon-puffed to provide the coarsely-divided, textured protein (e.g., textured vegetable protein).

In addition to the combination of edible (a) natural flesh or meat, (b) coarsely-divided, textured, extrusion-expanded protein or proteinaceous material(s), either with or without an appropriate amount of the edible, finely-divided, debittered, bland, soy protein concentrate, (c) acidulent (if needed), and (d) plasticizer (if desired), as pointed out above, one should include an edible chloride salt of an alkali metal or alkaline earth metal (e.g., sodium chloride) and curing salt (e.g., sodium nitrite and/or sodium nitrate, either with or without sodium chloride), and, if desired, seasoning (e.g., frankfurter seasoning), flavoring (e.g., hydrolyzed vegetable protein, ham flavoring, salt, sugars, and "liquid smoke"), and/or coloring (e.g., beet powder, animal blood components, and FD&C Red Number 2) agent(s). Liquid smoke, besides adding flavoring, facilitates the removal of the flexible casing or skin from products such as frankfurters.

When the full complement of the foregoing combination is used, the requisite percent by weight of the foregoing materials are set forth in the meat food mix formulation of Table D, below:

Table D

| | Percent by Weight |
|---|---|
| Edible Natural Flesh | 18–80 |
| Edible, Coarsely-Divided, Textured, Extrusion-Expanded-Protein | 3–30 (Essentially Dry Basis) |
| Added Edible Acidulent | 0–3 (Preferably 0.1–0.5) |
| Edible Plasticizer | 0.8–6 |
| Edible, Finely-Divided, Non-Textured, Soy Protein Concentrate, Emulsifier | 0–21* (0–85%, Preferably 20–85%, of the Coarsely-Divided, Textured, Extrusion-Expanded Protein) |
| Sodium Chloride | 1.5–3 |
| Edible Curing Composition, and Seasoning, Flavoring and/or Coloring Agent(s) | 1–5 |
| Added Water | 13–44 |

*When used, replaces some of the above-specified amount of Coarsely-Divided, Textured, Extrusion-Expanded Protein.

When a low level of edible natural flesh or meat set forth in Table D, above, is used, the higher levels of therein prescribed coarsely-divided, textured, extrusion-expanded protein and water, if desired, may be used, as set forth in Table E, below:

Table E

| | Percent by Weight |
|---|---|
| Edible Natural Flesh | 20 |
| Edible, Coarsely-Divided, Textured, Extrusion-Expanded Protein | 26 (Essentially Dry Basis) |
| Added Edible Acidulent | 1 |
| Edible Plasticizer | 6 |
| Edible, Finely-Divided, Non-Textured Soy Protein Concentrate, Emulsifier | (0–85%, Preferably 20–85%, of the Coarsely-Divided, Textured, Extrusion-Expanded Protein*) |
| Sodium Chloride | 2 |
| Edible Curing Composition, and Seasoning, Flavoring and/or Coloring Agent(s) | 4 |
| Added Water | 41 |
| | 100% |

*When used, replaces some of the above-specified amount of Coarsely-Divided, Textured, Extrusion-Expanded Protein.

The combination of (a) natural flesh or meat, and (b) coarsely-divided, textured, extrusion-expanded protein (either with or without the finely-divided, non-textured emulsifier) in Table E, above, is 46% of the entire mix.

When a high level of edible natural flesh or meat set forth in Table D, above, is used, the lower levels of therein prescribed coarsely-divided, textured, extrusion-expanded protein and water may be used, for example, as set forth in Table F, below:

Table F

| | Percent by Weight |
|---|---|
| Edible Natural Flesh | 78.9 |
| Edible, Coarsely-Divided, Textured, Extrusion-Expanded Protein | 3 (Essentially Dry Basis) |
| Added Edible Acidulent | 0.1 |
| Edible Plasticizer | 0.8 |
| Edible, Finely-Divided, Non-Textured, Soy Protein Concentrate, Emulsifier | (0–85%, Preferably 20–85%, of the Coarsely-Divided, Textured, Extrusion-Expanded Protein*) |
| Sodium Chloride | 2 |
| Edible Curing Composition, and Seasoning, Flavoring and/or Coloring Agent(s) | 2 |
| Added Water | 13 |
| | 100% |

*When used, replaces some of the above-specified amount of Coarsely-Divided, Textured, Extrusion-Expanded Protein.

The combination of (a) natural flesh or meat, and (b) coarsely-divided, textured, extrusion-expanded protein (either with or without the finely-divided, non-textured emulsifier) in Table F, above, is about 82% (i.e., 81.9%) of the entire mix.

The required percent by weight of the requisite combination of edible (a) natural flesh or meat, and (b) coarsely-divided, textured, extrusion-expanded protein, based on the total weight of the combination of those particular materials, are set forth in the mix formulation of Table G, below, and that Table shows a ratio of 0.59 to 24:1. When the finely-divided, non-textured, soy protein, emulsifying agent replaces some of the extrusion-expanded protein, the ratio of the three materials may be 0.59 to 24:0.15 to 1:0.85 to 0, respectively, or, preferably, 0.59 to 24:0.15 to 0.80:0.85 to 0.20, respectively.

Table G

| | Percent by Weight |
|---|---|
| Edible Natural Flesh | 37–96 |
| Edible, Coarsely-Divided, Textured, Extrusion-Expanded Protein | 63–4* (Essentially Dry Basis) |
| | 100% |

*When Finely-Divided, Non-Textured, Soy Protein Concentrate is used (e.g., 0-85%, preferably 20-85%, of the Coarsely-Divided, Textured, Extrusion-Expanded Protein), this amount, correspondingly, shall be decreased.

It should be understood that up to about 85%, preferably 20–85%, of the coarsely-divided, extrusion-expanded, textured protein material shown in Table G, above, may be replaced with the finely-divided, non-textured, debittered, bland, soy protein concentrate.

For some purposes, a preferred percent by weight of the requisite combination of edible (a) natural flesh or meat, and (b) coarsely-divided, textured, extrusion-expanded protein, based on the total weight of the combination of those particular materials, may be within the range shown in the mix formulation of Table H, below, and that Table shows a ratio of 1.85 to 24:1. When the finely-divided, non-textured, soy protein, emulsifying agent replaces some of the extrusion-expanded protein, the ratio of the three materials may be 1.85 to 24:0.15 to 1:0.85 to 0, respectively, or, preferably, 1.85 to 24:0.15 to 0.80:0.85 to 0.20, respectively.

Table H

| | Percent by Weight |
|---|---|
| Edible Natural Flesh | 65–96 |
| Edible, Coarsely-Divided, Textrured, Extrusion-Expanded Protein | 35–4* (Essentially Dry Basis) |
| | 100% |

*When Finely-Divided, Non-Textured, Soy Protein Concentrate is used (e.g., 0-85%, preferably 20-85%, of thhe Coarsely-Divided, Textured, Extrusion-Expanded Protein), this amount, ccorrespondingly, shall be decreased.

It should be understood that up to 85%, preferably 20–85%, of the coarsely-divided, extrusion-expanded, textured protein material shown in Table H, above, may be replaced with the finely-divided, non-textured, debittered, bland, soy protein concentrate.

The weight of the combination of edible (a) natural flesh or meat, and (b) coarsely-divided, textured, extrusion-expanded protein, either with or without the finely-divided, non-textured, soy protein concentrate, emulsifying agent, or acidulent, based on the total green batch weight (before cooking), as indicated by compositions shown in Tables D, E and F, above, generally should be 46 to 82%. The total weight of that combination, based on the weight of the cured, cooked, finished, sausage-type, meat food product, generally falls within the range of 48 to 92%.

Moreover, the cured, cooked, finished, sausage-type, meat food product of my invention should have a moisture-protein ratio (M/P) (e.g., the protein content being determined from a nitrogen analysis using Kjeldahl determination) of 1.2 to 5.5:1, preferably 2.1 to 4.9:1. Those ratios reflect a high protein and low fat content, which is desired.

I have found that a more stable, meat food emulsion is obtained if the sodium chloride and at least some of the edible natural flesh or meat and at least some of the added water are first mixed and comminuted to form a batter having a dough-like consistency, followed by adding thereto and comminuting therewith the remaining materials of the mix. This procedure extracts the binding protein from the flesh, which is important, since, in accordance with my invention, some of the flesh normally used in sausage-type, meat food products is replaced with coarsely-divided, textured, extrusion-expanded protein.

Sodium chloride also imparts flavor to the entire mix and tends to enhance its shelf-life by reducing microbal spoilage.

The Examples set forth below are for purposes of illustration only and my invention is not limited thereto, and in some instances at least a part of an Example may indicate processing or formulation conditions which should be avoided.

The coarsely-divided, textured, extrusion-puffed, soy protein product used in Examples I–IV was "Promate" 111 material. The coarsely-divided, textured, extrusion-puffed, soy protein product referred to in Examples V–VIII may be, for example, either Promate 111 or Promate 555 materials. Both Promate 111 and Promate 555 have about 50% soy protein on a dry weight basis; however, Promate 555 is a coarser product and has chunks of about ¼ inch, which is about twice the size of the coarse chunks of Promate 111.

EXAMPLE I

A frankfurter-type meat formulation was prepared with the following combination of constituents, which were added to form a single mix, and the mix was divided into four separate batches: 8n

|  | Weight |
|---|---|
| Pork Picnics | 55 lbs. |
| Pork Hearts | 5 lbs. |
| Pork Stomachs | 5 lbs. |
| Pork Jowls | 35 lbs. |
| Corn Syrup Solids | 2 lbs. |
| Sodium Chloride | 3.5 lbs. |
| Curing Salt Composition | 4 oz. |
| 90% Sodium Chloride |  |
| 6% Sodium Nitrite |  |
| 4% Sodium Nitrate |  |
| Sodium Erythorbate | ⅞ oz. |
| Added Water | 68 lbs. |

Each of the following designated materials were added to a different one of these four separate batches and the resulting mixes were designated as Batches 1 through 4:

Batch 1: 20 lbs. of textured, extrusion-puffed, soy protein which was ground to the fineness of flour;
Batch 2: 20 lbs. of coarsely-divided, textured, extrusion-puffed, soy protein in chunky form;
Batch 3: 15 lbs. of textured, extrusion-puffed, soy protein which was ground to the fineness of flour, and 5 lbs. of finely-divided, bland, GS-301 soy protein concentrate (emulsifier); and,
Batch 4: 15 lbs. of coarsely-divided, textured, extrusion-puffed, soy protein in chunky form, and 5 lbs. of finely-divided, bland, GL-301 soy protein concentrate (emulsifier).

The chunky, textured, extrusion-puffed, soy protein used in Batches 2 and 4 was in the form of chunks of approximately ⅛ inch × ⅜ inch × ⅜ inch.

Batches 2 and 4 had a ratio of natural flesh to coarsely-divided, textured, extrusion-expanded protein to finely-divided, non-textured, proteinaceous emulsifying agent of 100:20:0 and 100:15:5, respectively.

Each of Batches 1–4 was stuffed into No. 25, flexible cellulose casings and cured and cooked in a conventional smoke house under the following cooking cycle:
30 minutes at 140°F.;
30 minutes at 165°F.; and
at least 30 minutes at 175°F.
Cooking at 175°F. was continued until the internal temperature of the frankfurters reached about 158° to 160°F., which took a total cooking time of 1 ½ to 1 ¾ hours. The respective batches were then cold showered for 5 min., and thereafter were placed overnight in a cooler at 32°F.

The cured, cooked products of Batches 2 and 4 had a M/P ratio of about 3.8:1.

The next day, the consumer cooking of samples of frankfurters from each of Batches 1–4 was conducted by placing the frankfurters in a pot of boiling water, immediately placing a lid on the pot and removing the pot from the burner, allowing the frankfurters to cook in the boiling water for about 10–12 min., removing the frankfurters from the water, and allowing the cooked frankfurters to remain in the atmosphere for about 10 min., so as to cool them to room temperature. The percent shrinkage or weight loss resulting from this consumer cooking procedure was found to be as follows:

|  | % Shrinkage |
|---|---|
| Batch 1 | 5.3 |
| Batch 2 | 5.1 |
| Batch 3 | 3.0 |
| Batch 4 | 1.9 |

After being subjected to the above-described consumer cooking in boiling water, frankfurters from each of Batches 1 to 4 were tested by a panel of 4 experienced tasters for evaluation for bite, texture and appearance.

The panel determined that frankfurthers made from Batch 2 were better than those made from Batch 1, and those made from Batch 4 were better than those made from Batch 3. After comparing the frankfurters made from Batches 2 and 4, the panel determined that those made from Batch 4 had the best meat-like, frankfurter bite and texture.

Moreover, it was observed that the frankfurters made from Batches 1 and 2 had excessive fat caps and "greasing" (showing or evidencing breakdown of the emulsion), whereas those made from Batch 4 had only slight fat caps and showed no greasing.

The foregoing tests showed that: (1) the use of the textured, extrusion-puffed soy protein product which was ground to the fineness of flour (i.e., Batches 1 and 3) produced products lacking the desired texture and bite, whereas the use of the coarsely-divided, textured, extrusion-puffed, soy protein (i.e., Batches 2 and 4) provided frankfurters having better texture and bite; and, (2) the use of both (a) the coarsely-divided, textured, extrusion-puffed, soy protein, plus (b) the finely-divided, bland, soy protein concentrate (emulsifier) produced frankfurters having the best texture and bite (i.e., Batch 4)

The panel further observed that none of Batches 1 to 4 had a commercially-acceptable, cured meat color.

EXAMPLE II

The same frankfurter-type meat formulation set forth in Example I, above, for the four batches thereof was divided into two separate batches; 15 lbs. of coarse, textured, extrusion-puffed, soy protein in chunky form, and 5 lbs. of the finely-divided, bland, GL-301 soy protein concentrate (emulsifier) were added to each of the separate batches, and the resulting mixes were designated as Batches 5 and 6. The composition of Batches 5 and 6 thus corresponding with that of Batch 4 of Example I, above; however, Batches 5 and 6 were subjected to different methods of preparing the formulation thereof.

Batch 5 was formulated by rehydrating the non-flesh protein material (i.e., coarsely-divided textured, extrusion-puffed, soy protein, and GL-301 concentrate) and separately subjecting the admixture of the lean meat cuts, sodium chloride and one-third of the added water to chopping or comminution in a Silent Cutter or blender. The admixture was macerated until a fine emulsion or dough-like batter was obtained. Then the rehydrated, coarsely-divided, textured, extrusion-puffed, soy protein, GL-301 concentrate, seasoning, curing salt composition, and other meat or natural flesh materials were added to the Silent Cutter chopper or blender.

Batch 6 was subjected to a formulating procedure wherein the rehydrated, coarsely-divided, textured, extrusion-puffed, soy protein, and GL-301 concentrate were admixed in the Silent Cutter or blender and were macerated to a fine emulsion; then the remaining materials were added to the Silent Cutter chopper or blender.

Batches 5 and 6 were then processed as were Batches 1–4, above, by being subjected to the same stuffing, cooking and chilling operations and conditions.

On the following day, frankfurters made from Batches 5 and 6 were consumer cooked in boiling water, as described in Example I, and were tested for bite, texture and appearance by the same panel.

The panel determined that frankfurters made from Batch 5 had a better meat-like, frankfurter bite and texture than those made from Batch 6. However, frankfurters made from Batch 5 had slight fat caps, but they were far less evident than were the fat caps appearing in the frankfurters made from Batches 1–4 and 6. Again, as was the case with Batches 1–4, the cured meat color of frankfurters made from Batches 5 and 6 was not commercially acceptable.

Thus, frankfurters made from Batches 1–4 of Example I and Batches 5 and 6 of Example II did not have the desired pink cured color normally associated with commercial, all-meat type, frankfurter products. Moreover, the shelf-life, as determined by color stability and the formation of bacterial slime, was not as good as would be expected with commercial, all-meat type, frankfurther products. Still further, although the texture and bite of frankfurters made from Batch 5 were generally as good as found with commercial, all-meat frankfurters, the smoothness of the frankfurters made from Batch 5 were not as good as commercial, all-meat frankfurters.

EXAMPLE III

The same frankfurter-type meat formulation set forth in Example I, above, for the four batches thereof was divided into four separate batches; 15 lbs. of coarsely-divided textured, extrusion-puffed, soy protein in chunky form, and 5 lbs. of the finely-divided, bland, GL-301 soy protein concentrate were added to each of the separate batches, and the resulting mixes were designated as Batches 7 to 10. The composition of Batches 7–10 thus corresponded with that of Batch 4 of Example I, above, and Batches 5 and 6 of Example II, above; however, Batches 7–10 in instances differed from those batches and in some instances from each other as follows:

Batch 7: 5 oz. of sodium acid pyrophosphate;
Batch 8: no additional material;
Batch 9: 5 oz. of sodium acid pyrophosphate, 4 lbs. of egg albumen, and 4 lbs. of vitalized wheat gluten; and,
Batch 10: 5 oz. of sodium acid pyrophosphate.

Batches 7, 9 and 10 had a ratio of natural flesh to coarsely-divided, textured, extrusion-expanded protein to finely-divided, non-textured, proteinaceous emulsifying agent of 100:15:5, respectively.

The composition of Batches 7 and 10 did not differ from each other. However, they were separately produced at different times; therefore, Batch 7 was compared with Batch 8, and Batch 9 was compared with Batch 10.

Accordingly, Batches 7 and 10 had an acidulent (i.e., sodium acid pyrophosphate); Batch 8 did not have an acidulent or plasticizer; and Batch 9 had the acidulent and two plasticizers (i.e., egg albumen and vitalized wheat gluten).

Each of Batches 7–10 was formulated in accordance with the procedure used in formulating Batch 5 of Example II and, were subjected to the same stuffing, cooking and chilling operations and conditions used in preparing Batches 1 to 6.

The cured, cooked products of Batches 7 and 10 had a M/P ratio of about 3.8:1, whereas the M/P ratio of Batch 9 was about 3.7:1.

On the next day frankfurters made from Batches 7–10 were consumer-cooked in boiling water, as described above with respect to the frankfurters made from Batches 1–6, and were subjected to testing for bite, texture and appearance by the same panel as was used in testing the frankfurters made from Batches 1–6.

In comparing Batches 7 and 8, the panel found that the frankfurters made from Batch 7 had better cured meat color. The use of sodium acid pyrophosphate in Batch 7 thus improved the cured meat color.

The panel found that in comparing the textural characteristics of frankfurter made from Batches 7–10, that the texture and bite of frankfurters made from Batch 9 were decidedly better than those made from Batches 7, 8 and 10. The frankfurters made from Batch 9 were found to have a smoother feel in the mouth and, in addition, the initial bite or snap of the frankfurters made from Batch 9 were at least comparable to those found in commercial, all-meat frankfurters. The surface skin formation, which is important in facilitating the peeling away of the casing and packaging, was better with the frankfurters made from Batches 7 and 9; however, frankfurters made from Batch 9 had the best flavor.

These tests showed that the use of both the acidulent (i.e., sodium acid pyrophosphate) and plasticizer (i.e., egg albumen and vitalized wheat gluten) in Batch 9 decidedly improved the organoleptical properties of the frankfurters made therefrom.

In addition, the Batch 9 frankfurters had no fat caps, and did not exhibit a breakdown of the meat emulsion, as was evident, in varying degrees, from the frankfurters which were made from Batches 7, 8 and 10.

EXAMPLE IV

Samples of frankfurters made from Batch 4 of Example I and Batch 9 of Example III were vacuum packed in a synthetic, flexible, moisture-proof film, and were placed in a retail display case under 40 ft.-candles of light for 14 days. These products were evaluated periodically during the 14-day period for color fading and any visible formation of the characteristic milky slime associated with bacterial formation.

The frankfurters made from Batch 9 only slightly faded (i.e., showing good cured color stability) and showed no milky slime during the 14-day period, whereas the cured meat color of the Batch 4 frankfurters began to fade excessively on the 5th day of storage and had a milky surface fluid or slime formation on about the 12th day.

This shelf-life study showed that the acidulent (i.e., sodium acid pyrophosphate) not only enhanced the development of the cured meat color, but also enhanced the shelf-life stability of that color and effectively combatted the formation of visible bacterial slime.

EXAMPLE V

A frankfurter-type meat formulation may be prepared with the following materials:

|  | Weight |
|---|---|
| Lean Beef (80% Lean) | 15 lbs. |
| Lean Pork (80% Lean) | 35 lbs. |
| Pork Jowls | 50 lbs. |
| Finely-Divided, Non-Textured, "GL-301" Soy Protein Concentrate | 4 lbs. |
| Essentially Dry, Coarsely-Divided, Textured, Extrusion-Puffed, Soy Protein Material | 12 lbs. |
| Sodium Chloride | 3 lbs. 8 oz. |
| Sodium Acid Pyrophosphate | 5 oz. |
| Curing Salt Composition 96% Sodium Chloride 4% Sodium Nitrite | 4 oz. |
| Sodium Erythorbate | ⅞ oz. |
| Seasoning | 8 lbs. 4 ⅝ oz. |
| Added Water | 60 lbs. |

The ratio of natural flesh to coarsely-divided, textured, extrusion-expanded protein to finely-divided, non-textured, proteinaceous emulsifying agent in the foregoing formulation is 100:12:4 (i.e., 6.25:0.75:0.25), respectively. The M/P ratio of the cured, cooked product is about 3.4:1.

For some purposes, I prefer to include about 2-3 lbs. of edible plasticizer (e.g., egg albumen or the combination of egg albumen and vitalized wheat gluten) in the above formulation.

EXAMPLE VI

A smoked sausage-type meat formulation may be prepared with the following materials:

|  | Weight |
|---|---|
| Pork Trimmings (50% Lean) | 100 lbs. |
| Finely-Divided, Non-Textured, "GL-301" Soy Protein Concentrate | 4 lbs. |
| Essentially Dry, Coarsely-Divided, Textured, Extrusion-Puffed, Soy Protein Material | 12 lbs. |
| Curing Salt Composition 96% Sodium Chloride 4% Sodium Nitrite | 4 oz. |
| Sodium Erythorbate | ⅞ oz. |
| Seasoning | 8 lbs. 13⅞ oz. |
| Added Water | 50 lbs. |

The ratio of natural flesh to coarsely-divided, textured, extrusion-expanded protein to finely-divided, non-textured, proteinaceous emulsifying agent in the foregoing formulation is 100:12:4 (i.e., 6.25:0.75:0.25), respectively. The M/P ratio of the cured, cooked product is about 2.2:1.

For some purposes, I prefer to include about 2-3 lbs. of edible plasticizer (e.g., egg albumen or the combination of egg albumen and vitalized wheat gluten) in the above formulation.

EXAMPLE VII

A bologna-type meat formulation may be prepared with the following materials:

|  | Weight |
|---|---|
| Lean Beef (80% Lean) | 15 lbs. |
| Lean Pork (80% Lean) | 35 lbs. |
| Pork Jowls | 50 lbs. |
| Finely-Divided, Non-Textured, "GL-301" Soy Protein Concentrate | 4 lbs. |
| Essentially Dry, Coarsely-Divided, Textured, Extrusion-Puffed, Soy Protein Material | 12 lbs. |
| Sodium Chloride | 3 lbs. 8 oz. |
| Sodium Acid Pyrophosphate | 5 oz. |
| Curing Salt Composition 96% Sodium Chloride 4% Sodium Nitrite | 4 oz. |
| Sodium Erythorbate | ⅞ oz |
| Seasoning | 8 lbs. 8⅝ oz. |
| Added Water | 55 lbs. |

The ratio of natural flesh to coarsely-divided, textured, extrusion-expanded protein to finely-divided, non-textured, proteinaceous emulsifying agent in the foregoing formulation is 100:12:4 (i.e., 6.25:0.75:0.25), respectively. The M/P ratio of the cured, cooked product is about 3.8:1.

For some purposes, I prefer to include about 2-3 lbs. of edible plasticizer (e.g., egg albumen or the combination of egg albumen and vitalized wheat gluten) in the above formulation.

EXAMPLE VIII

A loaf or luncheon meat formulation may be prepared with the following materials:

|  | Weight |
|---|---|
| Lean Beef (80% Lean) | 15 lbs. |
| Lean Pork (80% Lean) | 35 lbs. |
| Pork Trimmings (30% Lean) | 50 lbs. |
| Finely-Divided, Non-Textured, "GL-301" Soy Protrin Concentrate | 10 lbs. |
| Essentially Dry, Coarsely-Divided, Textured, Extrusion-Puffed, Soy Protein Material | 12 lbs. |
| Sodium Chloride | 3 lbs. 12 oz. |
| Sodium Acid Pyrophosphate | 5 oz. |
| Curing Salt Composition 96% Sodium Chloride 4% Sodium Nitrite | 4 oz. |
| Sodium Erythorbate | ⅞ oz. |
| Sweet Pickles | 8 lbs. |
| Pimentos | 8 lbs. |
| Seasoning | 9 lbs. 1⅝ oz. |
| Added Water | 70 lbs. |

The ratio of natural flesh to coarsely-divided, textured, extrusion-expanded protein to finely-divided, non-textured, proteinaceous emulsifying agent in the foregoing formulation is 100:12:10 (i.e., 4.54:0.54:0.46), respectively. The M/P ratio of the cured, cooked product is about 4.1:1.

For some purposes, I prefer to include about 2-3 lbs. of edible plasticizer (e.g., egg albumen or the combination of egg albumen and vitalized wheat gluten) in the above formulation.

The following meat formulations further illustrate meat mixes which may be used, in accordance with my invention, to form sausage-type, meat food emulsions which may be cured to produce products having enhanced nutritional and organoleptical qualities, including enhanced cured meat color and shelf-life stability:

(A) Frankfurter-Type Products
  (1) Deboned Turkey Flesh
      Pork Jowls
      Added Ice Water
      Combination of coarsely-divided,
      textured, extrusion-expanded protein
      plus finely-divided, bland, soy
      protein concentrate
      Sodium Chloride
      Curing Salt Composition, Seasoning,
      Flavoring and Coloring
      Acidulent
      Plasticizer
  (2) Deboned Chicken Flesh
      Pork Picnics
      Jowls
      Added Ice Water
      Combination of coarsely-divided,
      textured, extrusion-expanded protein
      plus finely-divided, bland, soy protein
      concentrate
      Sodium Chloride
      Curing Salt Composition, Seasoning,
      Flavoring and Coloring
      Acidulent
      Plasticizer
(B) Loaf or Luncheon-Type Product
      Lean Beef
      Picnics
      Regular Pork Trim
      Added Water
      Combination of coarsely-divided,
      textured, extrusion-expanded protein
      plus finely-divided, bland soy protein
      concentrate
      Sodium Chloride
      Pickles and Pimentos
      Curing Salt Composition, Other
      Seasoning, Flavoring, and Coloring
      Acidulent
      Plasticizer
(C) Breakfast-Type, Pork Sausage Products
      Regular Pork Trim
      Combination of coarsely-divided,
      textured, extrusion-expanded protein
      plus finely-divided, bland, soy protein
      concentrate
      Added Water
      Sodium Chloride
      Curing Salt Composition, Seasoning,
      Flavoring and Coloring
      Acidulent
      Plasticizer It is readily apparent from the foregoing that various types of fine and coarse, comminuted, meat food emulsions, which are cured, cooked and/or smoked may be produced in accordance with my invention.

The foregoing detailed description has been given for clearness of understanding only, and no unnecessary limitations should be understood therefrom, as modifications will be obvious to those skilled in the art.

I claim:

1. The method of preparing a coarse or fine, comminuted, emulsified, sausage-type, meat food product to be cured and thereby provide a cured product having enhanced nutritional qualities, and a moisture to protein ratio of about 1.2 to 5.5:1, which comprises: coarsely or finely comminuting and emulsifying a meat food mix to be cured at a pH within the range of about 5.5 to 6.4 having (a) edible natural flesh, (b) edible, coarsely-divided, textured, extrusion-expanded protein, and (c) edible, finely-divided, non-textured, uniformly palatable, proteinaceous emulsifying agent in the weight ratio of about 0.59 to 24:0.15 to 1:0.85 to 0, respectively, and in a total amount so as to constitute about 46 to 82% of the entire mix, (d) edible, nitrogen-containing curing salt which provides nitric oxide during subsequent curing of the mix, (e) up to 3% added edible acidulent, (f) edible chloride salt of a member of the group consisting of alkali metal and alkaline earth metal, and (g) about 13 to 44% added water, to produce a coarsely or finely comminuted, emulsified, sausage-type, meat food product to be cured and thereby provide a cured product having enhanced nutritional qualities, and a moisture to protein ratio of about 1.2 to 5.5:1.

2. The method of claim 1 wherein said coarsely-divided, textured, extrusion-expanded protein has defatted soy protein.

3. The method of claim 1 wherein said finely-divided, non-textured, proteinaceous emulsifying agent has a soy protein concentrate comprising essentially that portion of defatted soybean protein which is insoluble in water at a pH of from 4 to 4.8, has been washed and substantially free of undesired beany taste, and has an adjusted, elevated pH of about 6 to 10.5.

4. The method of claim 1 wherein said coarsely-divided, textured, extrusion-expanded protein has defatted soy protein, and said finely-divided, non-textured, proteinaceous emulsifying agent has a soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5, and those materials are present in the weight ratio of about 0.15 to 0.80:0.85 to 0.20, respectively.

5. The method of claim 1 wherein said coarsely-divided, textured, extrusion-expanded protein has defatted soy protein; said finely-divided, non-textured, proteinaceous emulsifying agent has a soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5; said curing salt has sodium nitrite; said acidulent has disodium acid pyrophosphate; and, said chloride salt is sodium chloride.

6. The method of claim 1 wherein said chloride salt of said mix is sodium chloride, and in comminuting and emulsifying said mix, sodium chloride and at least some of said edible natural flesh and at least some of said added water are substantially uniformly comminuted to form a batter having a pasty consistency and extract binding protein from said flesh, followed by adding thereto and comminuting and emulsifying therewith the remaining materials of said mix.

7. The method of preparing a coarse or fine, comminuted, emulsified, sausage-type, meat food product to be cured and thereby provide a cured product having enhanced nutritional qualities, and a moisture to protein ratio of about 2.1 to 4.9:1, which comprises: coarsely or finely comminuting and emulsifying a meat food mix to be cured at a pH within the range of about 5.5 to 6.4 having (a) edible natural flesh, (b) edible, coarsely-divided, textured, extrusion-expanded protein, and (c) edible, finely-divided, non-textured, uniformly palatable, proteinaceous emulsifying agent in the weight ratio of about 1.85 to 24:0.15 to 1:0.85 to 0, respectively, and in a total amount so as to constitute about 46 to 82% of the entire mix, (d) edible, nitrogen-containing curing salt which provides nitric oxide during subsequent curing of the mix, (e) up to 3% added edible acidulent, (f) edible chloride salt of a member of the group consisting of alkali metal and alkaline earth metal, and (g) about 13 to 44% added water, to produce a coarsely or finely comminuted, emulsified, sausage-type, meat food product to be cured and thereby provide a cured product having enhanced nutritional qualities, and a moisture to protein ratio of about 2.1 to 4.9:1.

8. The method of claim 7 wherein said coarsely-divided, textured, extrusion-expanded protein has defatted soy protein.

9. The method of claim 7 wherein said finely-divided, non-textured, proteinaceous emulsifying agent has a soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5.

10. The method of claim 7 wherein said coarsely-divided, textured, extrusion-expanded protein has defatted soy protein, and said finely-divided, non-textured, proteinaceous emulsifying agent has a soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5, and those materials are present in the weight ratio of about 0.15 to 0.80:0.85 to 0.20, respectively.

11. The method of claim 7 wherein said coarsely-divided, textured, extrusion-expanded protein has defatted soy protein; said finely-divided, non-textured, proteinaceous emulsifying agent has a soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5; said curing salt has sodium nitrite; said acidulent has disodium acid pyrophosphate; and, said chloride salt is sodium chloride.

12. The method of claim 7 wherein said chloride salt of said mix is sodium chloride, and in comminuting and emulsifying said mix, sodium chloride and at least some of said edible natural flesh and at least some of said added water are substantially uniformly comminuted to form a batter having a pasty consistency and extract binding protein from said flesh, followed by adding thereto and comminuting and emulsifying therewith the remaining materials of said mix.

13. The method of preparing a coarse or fine, comminuted, emulsified, sausage-type, meat food product to be cured and thereby provide a cured product having enhanced nutritional and organoleptical qualities, and a moisture to protein ratio of about 1.2 to 5.5:1, which comprises: coarsely or finely comminuting and emulsifying a meat food mix to be cured at a pH within the range of about 5.5 to 6.4 having (a) edible natural flesh, (b) edible, coarsely-divided, textured, extrusion-expanded protein, and (c) edible, finely-divided, non-textured, uniformly palatable, proteinaceous emulsifying agent in the weight ratio of about 0.59 to 24:0.15 to 1:0.85 to 0, respectively, and in a total amount so as to constitute about 46 to 82% of the entire mix, (d) edible, nitrogen-containing curing salt which provides nitric oxide during subsequent curing of the mix, (e) up to 3% added edible acidulent, (f) edible chloride salt of a member of the group consisting of alkali metal and alkaline earth metal, (g) edible plasticizer which enhances the plasticity and organoleptical qualities of the mix, and (h) about 13 to 44% added water, to produce a coarsely or finely comminuted, emulsified, sausage-type, meat food product to be cured and thereby provide a cured product having enhanced nutritional and organoleptical qualities, and a moisture to protein ratio of about 1.2 to 5.5:1.

14. The method of claim 13 wherein said plasticizer is a member of the group consisting of egg albumen, wheat gluten, and admixtures thereof.

15. The method of claim 13 wherein said coarsely-divided, textured, extrusion-expanded protein has defatted soy protein.

16. The method of claim 13 wherein said finely-divided, non-textured, proteinaceous emulsifying agent has a soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5.

17. The method of claim 13 wherein said coarsely-divided, textured, extrusion-expanded protein has defatted soy protein, and said finely-divided, non-textured, proteinaceous emulsifying agent has a soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5, and those materials are present in the weight ratio of about 0.15 to 0.80:0.85 to 0.20, respectively.

18. The method of claim 13 wherein said coarsely-divided, textured, extrusion-expanded protein has defatted soy protein; said finely-divided, non-textured, proteinaceous emulsifying agent has a soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5; said curing salt has sodium nitrite; said acidulent has disodium acid pyrophosphate; and, said chloride salt is sodium chloride.

19. The method of claim 13 wherein said chloride salt of said mix is sodium chloride, and in comminuting and emulsifying said mix, sodium chloride and at least some of said edible natural flesh and at least some of said added water are substantially uniformly comminuted to form a batter having a pasty consistency and extract binding protein from said flesh, followed by adding thereto and comminuting and emulsifying therewith the remaining materials of said mix.

20. A cured, coarse or fine, comminuted, emulsified, sausage-type, meat food product having enhanced nutritional qualities, good cure color, good color stability, good shelf-life, and a moisture to protein ratio of about 1.2 to 5.5:1, which comprises a cured, coarsely or finely comminuted, emulsified, substantially homogeneous, meat food mix of (a) edible natural flesh, (b) edible, coarsely-divided, textured, extrusion-expanded protein, and (c) edible, finely-divided, non-textured emulsifier of soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5, in the weight ratio of about 0.59 to 24:0.15 to 1:0.85 to 0, respectively, and in a total amount so as to constitute about 48 to 92% of the entire cured mix, (d) sodium nitrite-containing curing salt, (e) up to 3% added edible acidulent, (f) sodium chloride, and (g) added moisture.

21. A cured, coarse or fine, comminuted, emulsified, sausage-type, meat food product having enhanced nutritional qualities, good cure color, good color stability, good shelf-life, and a moisture to protein ratio of about 1.2 to 5.5:1, which comprises a cured, coarsely or finely comminuted, emulsified, substantially homogeneous, meat food mix of (a) edible natural flesh, (b) edible, coarsely-divided, textured, extrusion-expanded, defatted soy protein, and (c) edible, finely-divided, non-textured emulsifier of soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5, in the weight ratio of about 0.59 to 24:0.15 to 1:0.85 to 0, respectively, and in a total amount so as to constitute about 48 to 92% of the entire cured mix, (d) sodium nitrite-containing curing salt, (e) up to 3% added edible acidulent, (f) sodium chloride, and (g) added moisture.

22. A cured, coarse or fine, comminuted, emulsified, sausage-type, meat food product having enhanced nutritional and organoleptical qualities, good cure color, good color stability, good shelf-life, and a moisture to protein ratio of about 1.2 to 5.5:1, which comprises a cured, coarsely or finely comminuted, emulsified, substantially homogeneous, meat food mix of (a) edible natural flesh, (b) edible, coarsely-divided, textured, extrusion-expanded, defatted soy protein, and (c) edible, finely-divided, non-textured emulsifier of soy protein concentrate comprising essentially that portion of defatted soybean protein which is insoluble in water at a pH of from 4 to 4.8, has been washed and substantially freed of undesired beany taste, and has an adjusted, elevated pH of about 6 to 10.5, in the weight ratio of about 0.59 to 24:0.15 to 1:0.85 to 0, respectively, and in a total amount so as to constitute about 48 to 92% of the entire cured mix, (d) sodium nitrite-containing curing salt, (e) up to 3% disodium acid pyrophosphate acidulent, (f) sodium chloride, (g) up to 6% edible plasticizer which enhances the plasticity and organoleptic qualities of the cured mix and is from the group consisting of egg albumen, wheat gluten, and admixtures thereof, and (h) added moisture.

* * * * *

UNITED STATES PATENT AND TRADEMARK OFFICE
CERTIFICATE OF CORRECTION

PATENT NO. : 3,873,740

DATED : March 25, 1975

INVENTOR(S) : Robert N. Terrell

It is certified that error appears in the above-identified patent and that said Letters Patent are hereby corrected as shown below:

Column 1, line 48, after "emulsion" insert a closing parenthesis; column 7, line 21, change "a" to -- as --; column 9, line 4, place quotes around the term "extrusion-expanded"; column 9, line 6, place quotes before "extrusion-"; column 9, line 7, place quotes after "expanded-"; column 11, line 2, put quotes around "balloon-puffed"; column 11, line 7, put quotes around "extrusion-expanded"; column 11, line 24, put quotes around "balloon-puffing"; column 12, line 55, change "of" to -- or --; column 14, line 31, put quotes around "GL-301"; column 14, line 43, put quotes around "GL-301"; column 15, line 3, put quotes around "GL-301"; column 16, line 11, put quotes around "Liquid smoke"; column 19, lines 1, 2, 3, 4, and 6, put quotes around "Promate"; column 19, line 12, delete "8n"; column 19, line 37, change "GS-301" to -- "GL-301" --; column 19, line 41, put quotes around "GL-301"; column 20, line 52, put quotes around "GL-301"; column 20, line 56, change "corresponding" to -- corresponded --; column 20, line 62, put quotes around "GL-301"; column 21, line 2, put quotes around "GL-301"; column 21, line 8, put quotes around "GL-301"; column 21, line 50, put quotes around "GL-301"; column 26, line 13, change "free" to -- freed --.

Signed and Sealed this thirtieth Day of December 1975

[SEAL]

Attest:

RUTH C. MASON
Attesting Officer

C. MARSHALL DANN
Commissioner of Patents and Trademarks